US008113933B2

(12) United States Patent
Thomas

(10) Patent No.: US 8,113,933 B2
(45) Date of Patent: Feb. 14, 2012

(54) GAMING MACHINE PROVIDING MULTIPLE POKER GAMES WITH A PUSH UP FEATURE

(75) Inventor: Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 1339 days.

(21) Appl. No.: 11/243,487

(22) Filed: Oct. 3, 2005

(65) Prior Publication Data

US 2006/0073866 A1 Apr. 6, 2006

Related U.S. Application Data

(60) Provisional application No. 60/522,447, filed on Oct. 2, 2004.

(51) Int. Cl.
*A63F 13/00* (2006.01)

(52) U.S. Cl. .......................................................... 463/13

(58) Field of Classification Search .............. 463/11–13, 463/16–20

See application file for complete search history.

(56) References Cited

U.S. PATENT DOCUMENTS

| | | | | |
|---|---|---|---|---|
| 5,976,016 | A * | 11/1999 | Moody et al. | 463/13 |
| 6,007,066 | A * | 12/1999 | Moody | 273/292 |
| 6,257,979 | B1 * | 7/2001 | Walker et al. | 463/13 |
| 6,517,074 | B1 * | 2/2003 | Moody et al. | 273/292 |
| 6,561,898 | B2 * | 5/2003 | Moody | 463/13 |
| 6,802,773 | B2 * | 10/2004 | Moody | 463/13 |
| 2001/0003709 | A1 * | 6/2001 | Adams | 463/20 |
| 2003/0092475 | A1 * | 5/2003 | Fox | 463/13 |

* cited by examiner

*Primary Examiner* — David L Lewis
*Assistant Examiner* — Eric M Thomas
(74) *Attorney, Agent, or Firm* — Schwegman, Lundberg & Woessner, P.A.

(57) ABSTRACT

Systems and methods provide a gaming machine having a poker game with a push-up feature. One aspect of the systems and methods include displaying a main hand and providing a plurality of push-up hands. As each main hand is dealt, cards to be placed in the push-up hands are determined. The push-up hands may comprise the hands from the first deal in the main hand. Alternatively, the push-up hands may comprise cards held in the main hand supplemented by randomly drawn cards.

24 Claims, 19 Drawing Sheets

GAMING MACHINE PROVIDING MULTIPLE POKER GAMES WITH A PUSH UP FEATURE

RELATED APPLICATION

This application claims priority under 35 U.S.C. 119(e) from U.S. Provisional Patent Application Ser. No. 60/522,447, filed Oct. 2, 2004, entitled "GAMING MACHINE HAVING POKER GAME WITH PUSH-UP FEATURE" which is hereby incorporated by reference.

FIELD

The present invention relates generally to gaming devices, and more particularly to a gaming device providing multiple poker games with a push up feature.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2004, WMS Gaming, Inc. All Rights Reserved.

BACKGROUND

Today's gaming machine typically comprises a computerized system controlling a video display or reels that provide wagering games such as slots, video card games (poker, blackjack etc.), video keno, video bingo, video pachinko and other games typical in the gaming industry. Generally, the popularity of such machines with players is dependent on the likelihood (or perceived likelihood) of winning money at the machine and the intrinsic entertainment value of the machine relative to other available gaming options. Players also appreciate the reliability of a gaming machine, as do the casino operators. Shrewd operators consequently strive to employ the most entertaining, exciting, and reliable machines available because such machines attract frequent play and hence increase profitability to the operator.

Some conventional gaming machines provide a poker based wagering game. However, in such systems, a single hand of poker is provided for each wagering round and a pay table determines the payout for various combinations of cards in the dealt hand. Thus, the look and feel of the poker game in conventional gaming systems is not that much different from the standard poker game played in homes across the world. As a result, there is a need in the art for the present invention.

SUMMARY

The above-mentioned shortcomings, disadvantages and problems are addressed by the present invention, which will be understood by reading and studying the following specification.

Systems and methods for operating a gaming machine having a poker game with a push-up feature are disclosed. One aspect of the systems and methods include displaying a main hand and providing a plurality of push-up hands. As each main hand is dealt, cards to be placed in the push-up hands are determined. The push-up hands may comprise the hands from the first deal in the main hand. Alternatively, the push-up hands may comprise cards held in the main hand supplemented by randomly drawn cards.

A further aspect of the systems and methods includes providing a multiplier for the push-up hands. The multiplier may be applied to a randomly selected push-up hand. Additionally, the multiplier may be applied based on a level of the push-up hand.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

Figure 1:
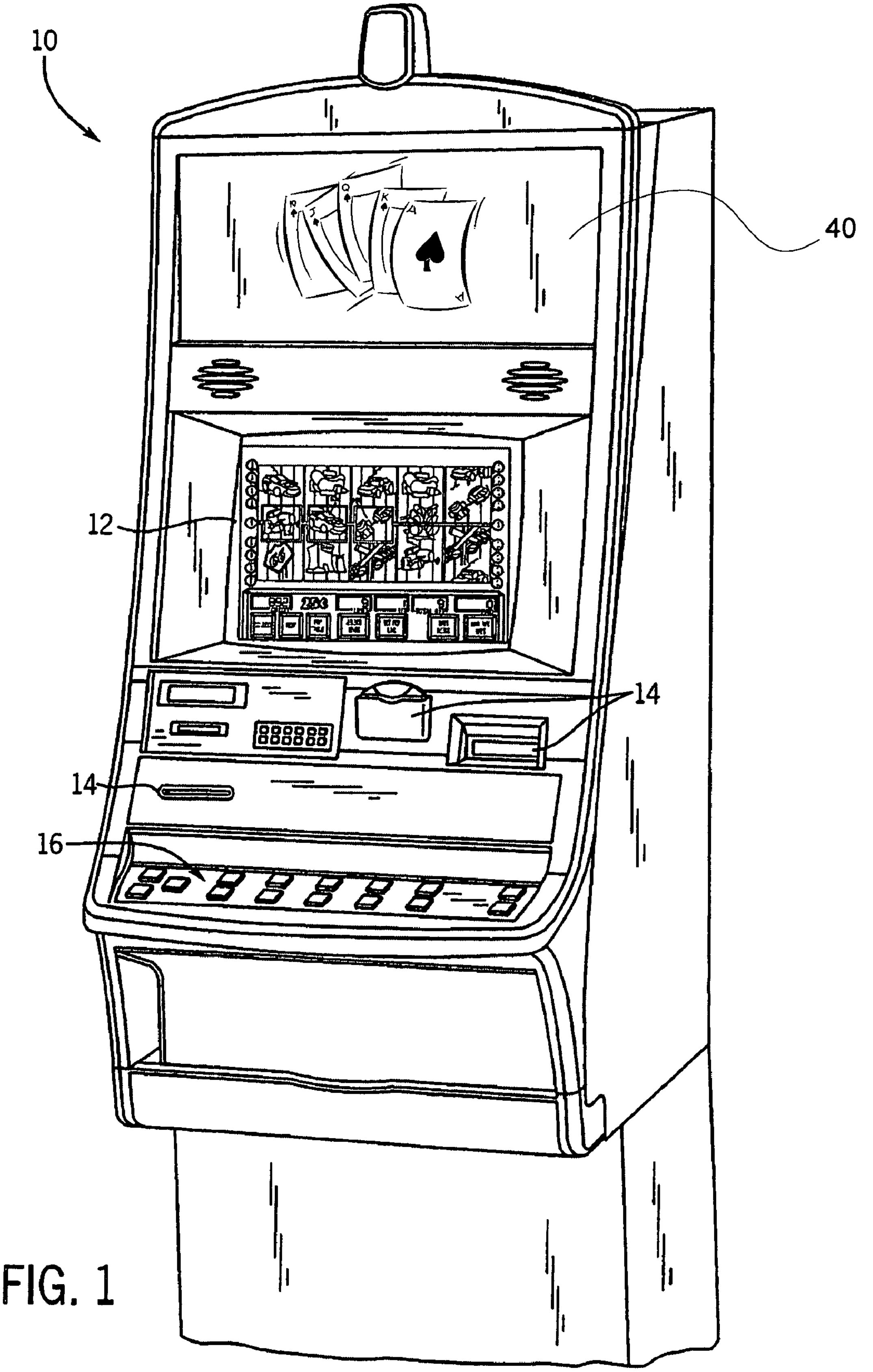
FIG. 1 is a perspective view of an exemplary gaming machine incorporating embodiments of the present invention.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

FIG. 1 illustrates an exemplary gaming machine 10, also referred to as a Video Lottery Terminal (VLT), in which embodiments of the invention may be implemented. In some embodiments, gaming machine 10 is operable to conduct a wagering game such as mechanical or video slots, poker, keno, bingo, or blackjack. If based in video, the gaming machine 10 includes a video display 12 such as a cathode ray tube (CRT), liquid crystal display (LCD), plasma, or other type of video display known in the art. A touch screen preferably overlies the display 12. In the illustrated embodiment, the gaming machine 10 is an "upright" version in which the display 12 is oriented vertically relative to a player. Alternatively, the gaming machine may be a "slant-top" version in which the display 12 is slanted at about a thirty-degree angle toward the player. Still further, the gaming machine may be housed in a wall mounted or other vertically mounted cabinet. In yet further embodiments, the gaming machine may be housed in a portable or handheld device. In such devices, the user interface elements (buttons, screen etc.) may be scaled down or eliminated in order to fit the elements into an appropriate housing for a handheld or portable gaming machine.

The gaming machine 10 includes a plurality of possible credit receiving mechanisms 14 for receiving credits to be used for placing wagers in the game. The credit receiving mechanisms 14 may, for example, include a coin acceptor, a bill acceptor, a ticket reader, and a card reader. The bill acceptor and the ticket reader may be combined into a single unit. The card reader may, for example, accept magnetic cards and smart (chip) cards coded with money or designating an account containing money.

In some embodiments, the gaming machine 10 includes a user interface comprising a plurality of push-buttons 16, the above-noted touch screen, and other possible devices. The plurality of push-buttons 16 may, for example, include one or more "bet" buttons for wagering, a "play" button for commencing play, a "collect" button for cashing out, a help" button for viewing a help screen, a "pay table" button for viewing the pay table(s), and a "call attendant" button for calling an attendant. Additional game specific buttons may be provided to facilitate play of the specific game executed on the machine. The touch screen may define touch keys for implementing many of the same functions as the push-buttons. Other possible user interface devices include a keyboard and a pointing device such as a mouse or trackball.

In some embodiments, gaming machine 10 includes a top box 40. Top box 40 may contain a video display, a mechanical display, or a diorama display that supplements display 12. For example, the display in top box 40 may be a wheel such as a rotating wheel, mechanical dice, a board for a board game, or other such display.

A processor controls operation of the gaming machine 10. In response to receiving a wager and a command to initiate play, the processor randomly selects a game outcome from a plurality of possible outcomes and causes the display 12 to depict indicia representative of the selected game outcome. In the case of slots for example mechanical or simulated slot reels are rotated and stopped to place symbols on the reels in visual association with one or more pay lines. If the selected outcome is one of the winning outcomes defined by a pay table, the processor awards the player with a number of credits associated with the winning outcome.

Figure 2:
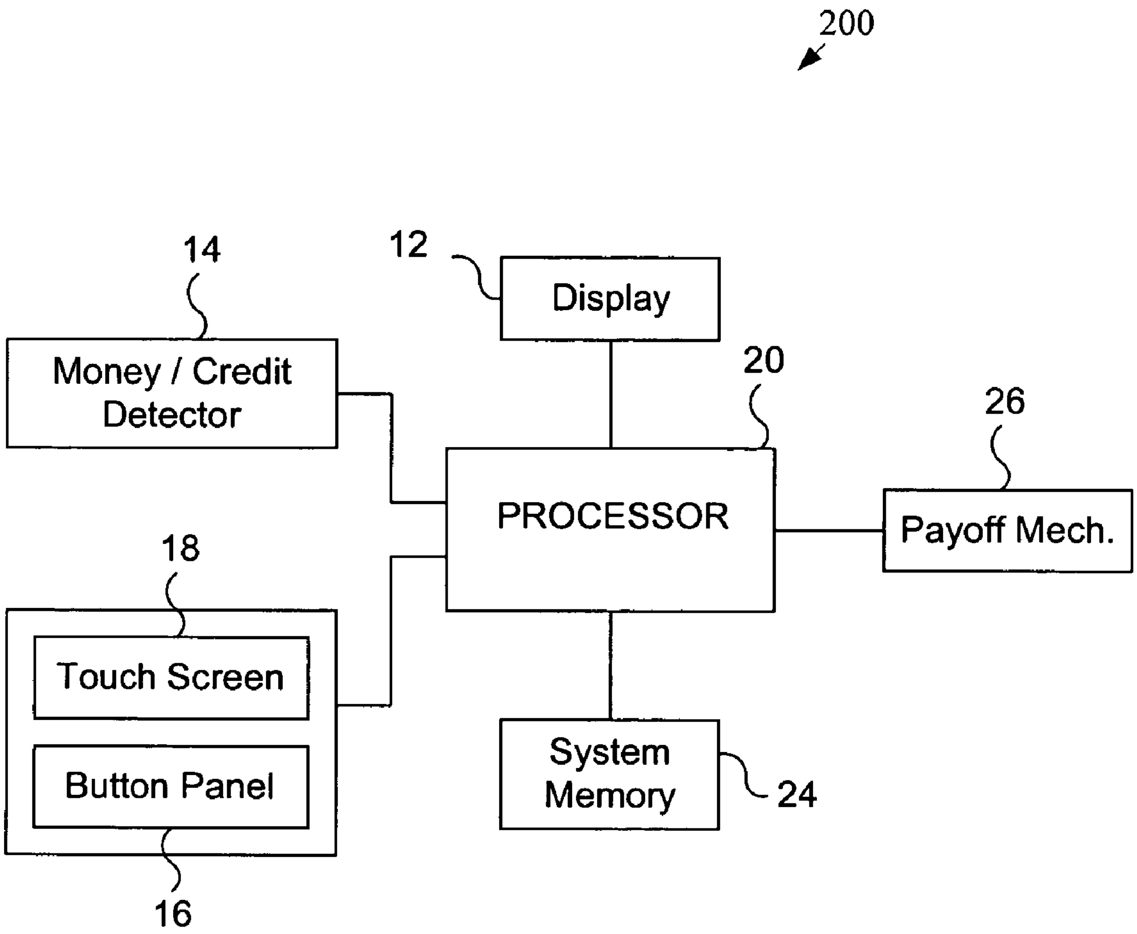
FIG. 2 is a block diagram of a gaming control system according to embodiments of the invention and suitable for operating the gaming machine in FIG. 1.

FIG. 2 is a block diagram of a control system suitable for operating the gaming machine. Money/credit detector 22 signals a processor 20 when a player has inserted money, tickets, tokens, cards or other mechanism for obtaining credits for plays on the gaming machine. Using a button panel 16 and/or a touch screen 18 (also see FIG. 1), the player may select any variables associated with the wagering game and place his/her wager to purchase a play of the game. In a play of the game, the processor 20 generates at least one random event using a random number generator (RNG) and provides an award to the player for a winning outcome of the random event. Alternatively, the random event may be generated by a remote computer using an RNG or pooling schema and then transmitted to the gaming machine. The processor 20 operates the display 12 to represent the random event(s) and outcome(s) in a visual form that can be understood by the player. In addition to the processor 20, the control system may include one or more additional slave control units for operating the display 12 and any secondary displays.

System memory 24 stores control software, operational instructions and data associated with the gaming machine. In one embodiment, the system memory 24 comprises a separate read-only memory (ROM) and battery-backed random-access memory (RAM). However, it will be appreciated that the system memory 24 may be implemented on any of several alternative types of memory structures or may be implemented on a single memory structure. A payoff mechanism 26 is operable in response to instructions from the processor 20 to award a payoff to the player. The payoff may, for example, be in the form of a number of credits. The number of credits is determined by one or more math tables stored in the system memory 24.

Figure 3:
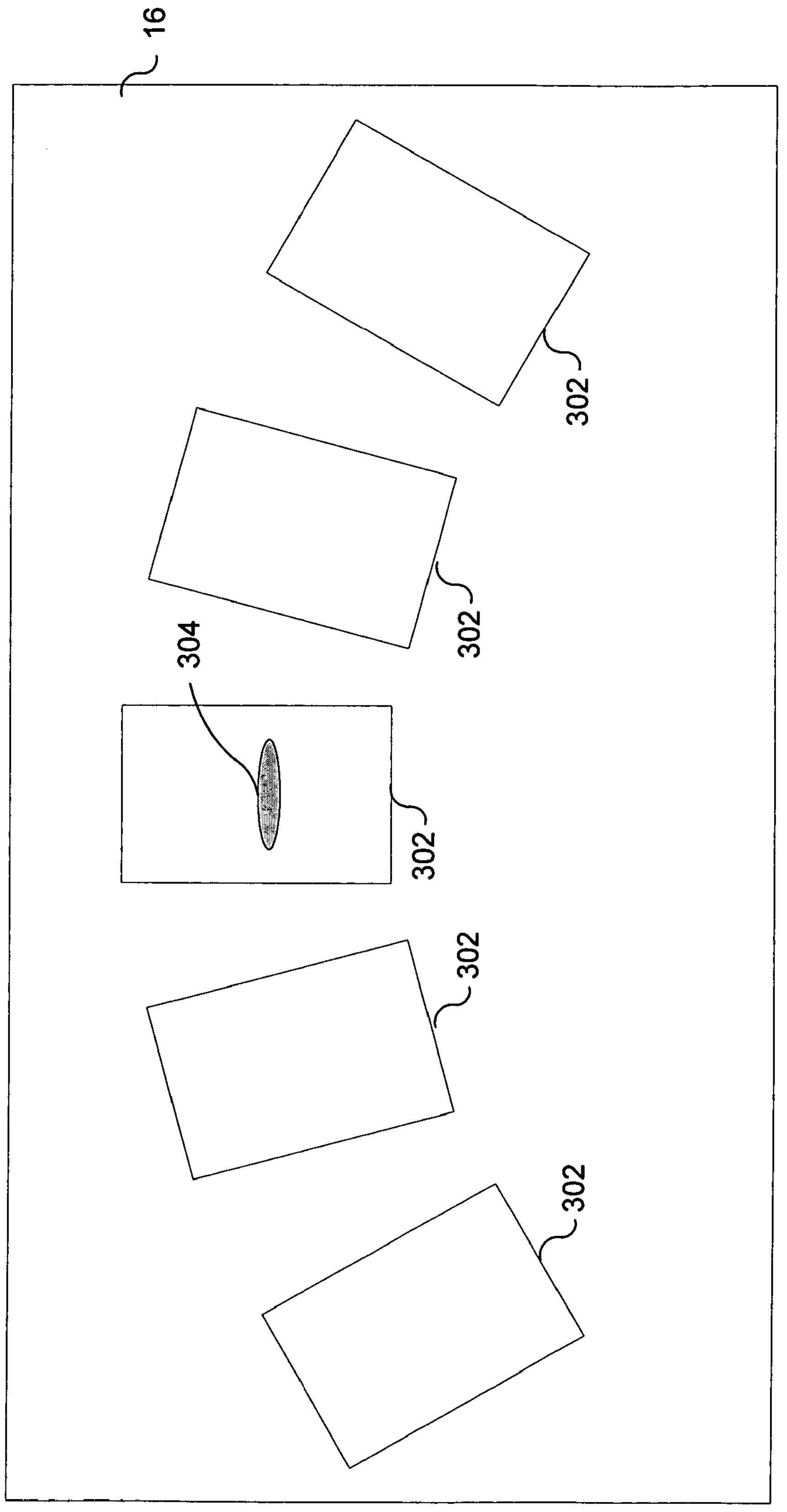
FIG. 3 is a block diagram illustrating a button panel according to exemplary embodiments of the invention.

FIG. 3 is a block diagram illustrating a button panel 16 according to exemplary embodiments of the invention. The button panel 16 illustrated may be a separate button panel of a set of button panels, or a portion of single button panel. In some embodiments, button panel 16 includes buttons 302 arranged in an arc. In some embodiments, one of the buttons has a tactile indicia 304 enabling a user to determine the position of the buttons in relation to the user's hand without having to look at the button panel. In some embodiments, the tactile indicia 304 is a nub raised over the surface of the button. In alternative embodiments, the tactile indicia is a depression in the button. In further alternative embodiments, the tactile indicia comprises a button surface or portion of a button surface that is rougher than that of other buttons. In some embodiments, the buttons represent positions of cards that the user desires to hold during a game play.

The tactile indicia as illustrated in FIG. 3 is placed on a center button of a button panel. However, the tactile indicia may be placed on other buttons, for example on either or both end buttons.

Figure 4:
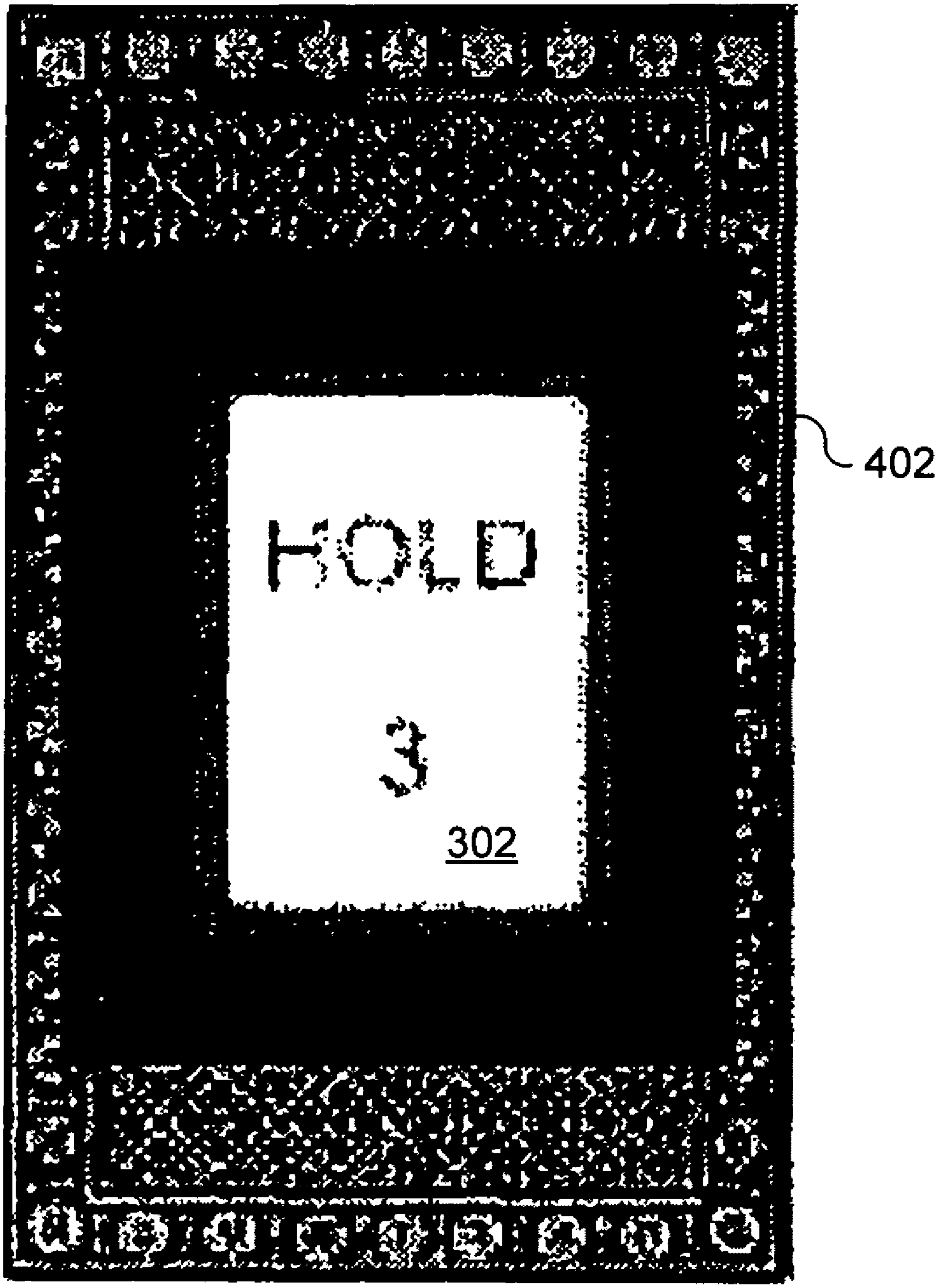
FIG. 4 is an illustration providing further detail of a button panel according to exemplary embodiments of the invention.

FIG. 4 is an illustration providing further detail of a button panel according to exemplary embodiments of the invention. In some embodiments, an area 402 surrounding button 302 is etched with an image representing a card back. Various images may be used as a card back, the embodiments of the invention are not limited to a particular card back.

Figure 5A:
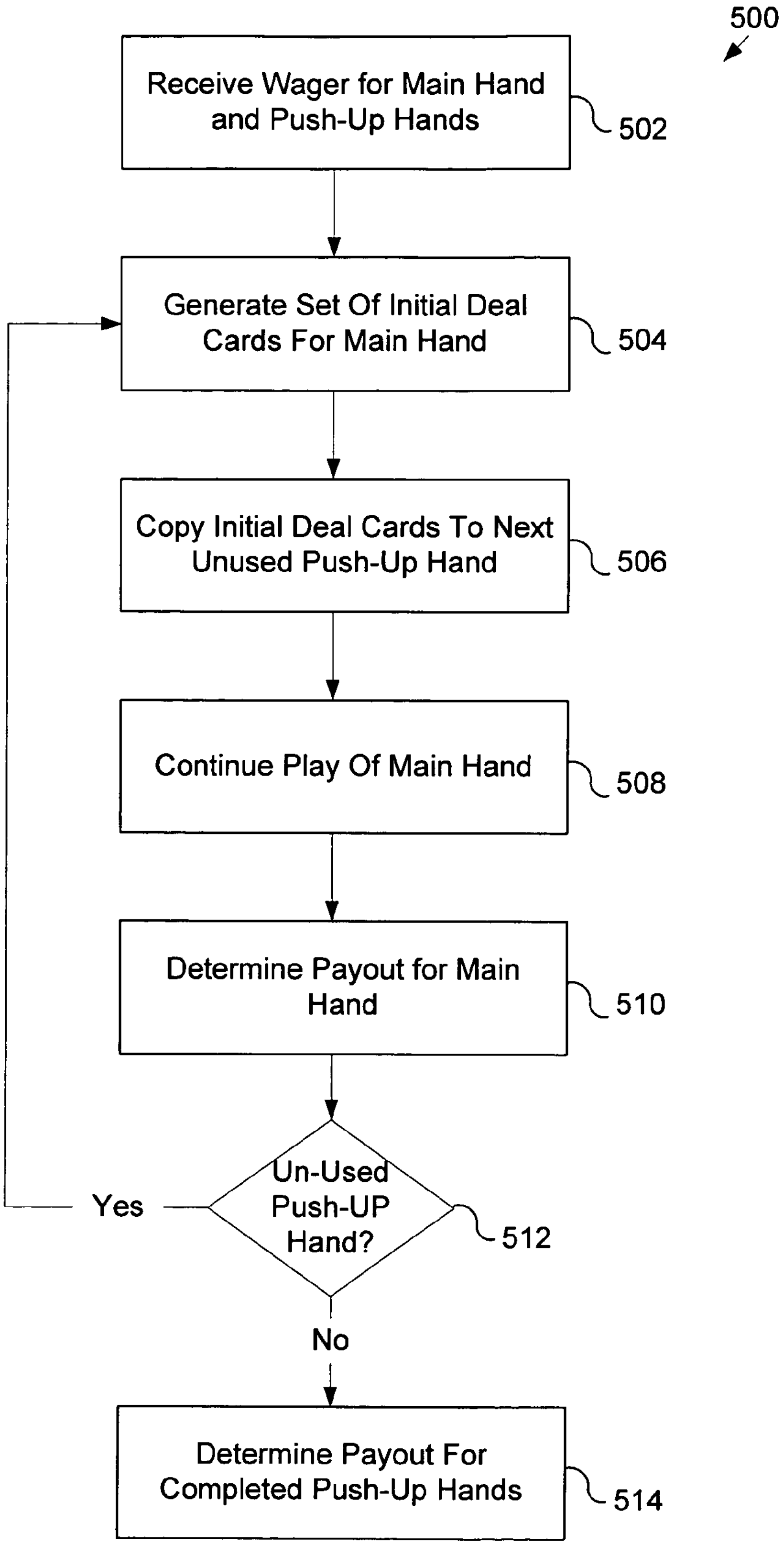
FIGS. 5A and 5B are flowcharts illustrating methods for providing a poker game with a push-up feature according to embodiments of the invention.
Figure 6A:
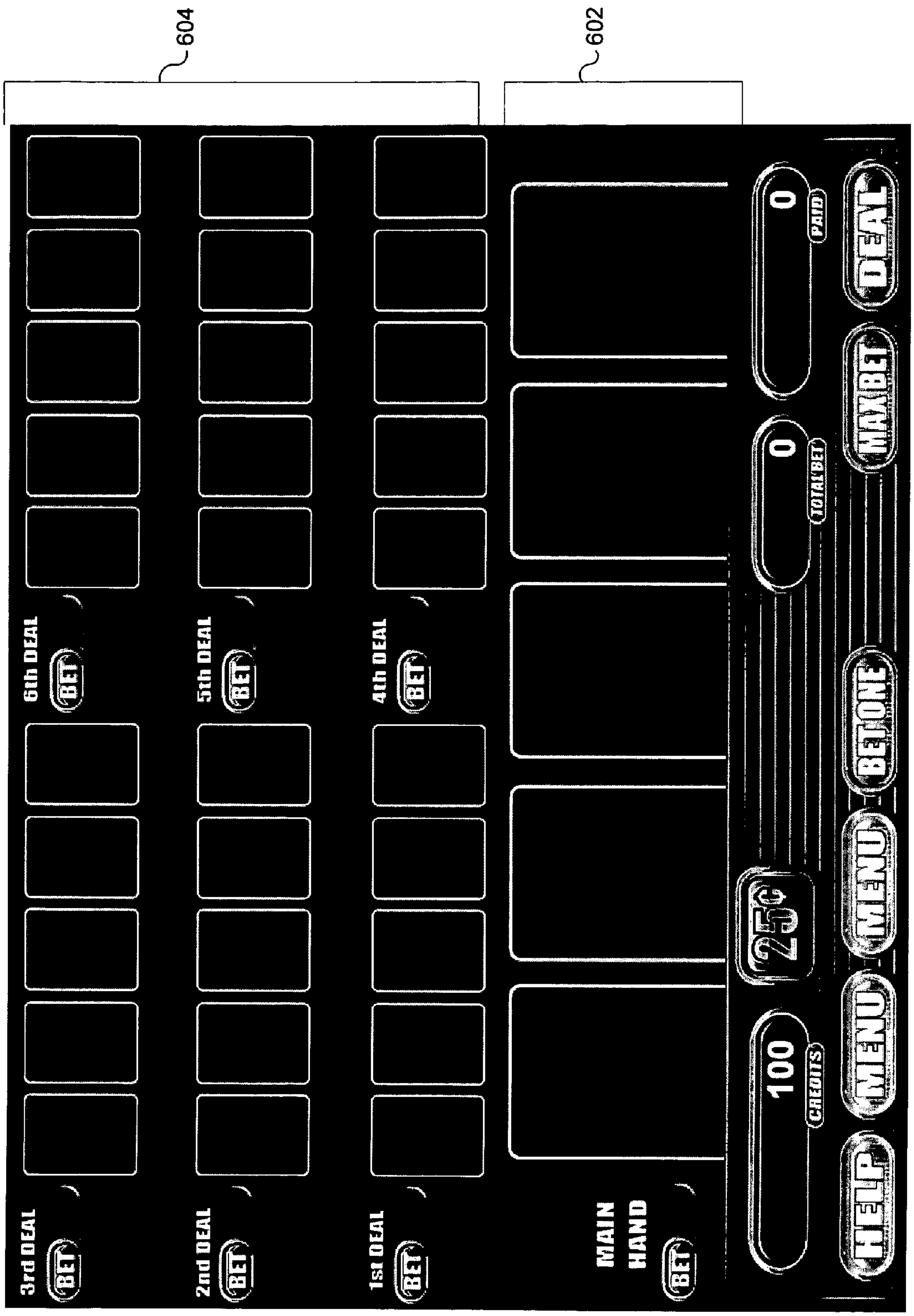
FIGS. 6A-6K are screen illustrations for a poker game with a push-up feature according to embodiments of the invention.

FIG. 5A is a flowchart illustrating a method for providing a poker game with a push-up feature according to embodiments of the invention. The method begins by receiving a wager to initiate game play of a series of main hands and a number of push-up hands (block 502). The number of push-up hands to be played may be predefined by the system, or the player may select the number of push-up hands to be played. The wager may be divided evenly among the main hands and push-up hands, or a separate wager may be supplied for each push-up hand and main hand and then added for a total wager. In some embodiments, a "Max Bet" button may be used to conveniently bet the maximum amount for each of the main hand and push-up hands. In the initial state of the game, the main hand and push-up hands are unused, that is, they do not contain any cards. In some embodiments of the invention, six push-up hands are provided. However, the embodiments of the invention are not limited to any particular number of push-up hands. FIG. 6A illustrates an initial screen for a push-up poker game according to embodiments of the invention. As illustrated, the initial screen includes main hand area 602 and a push-up hand area 604.

Figure 6B:
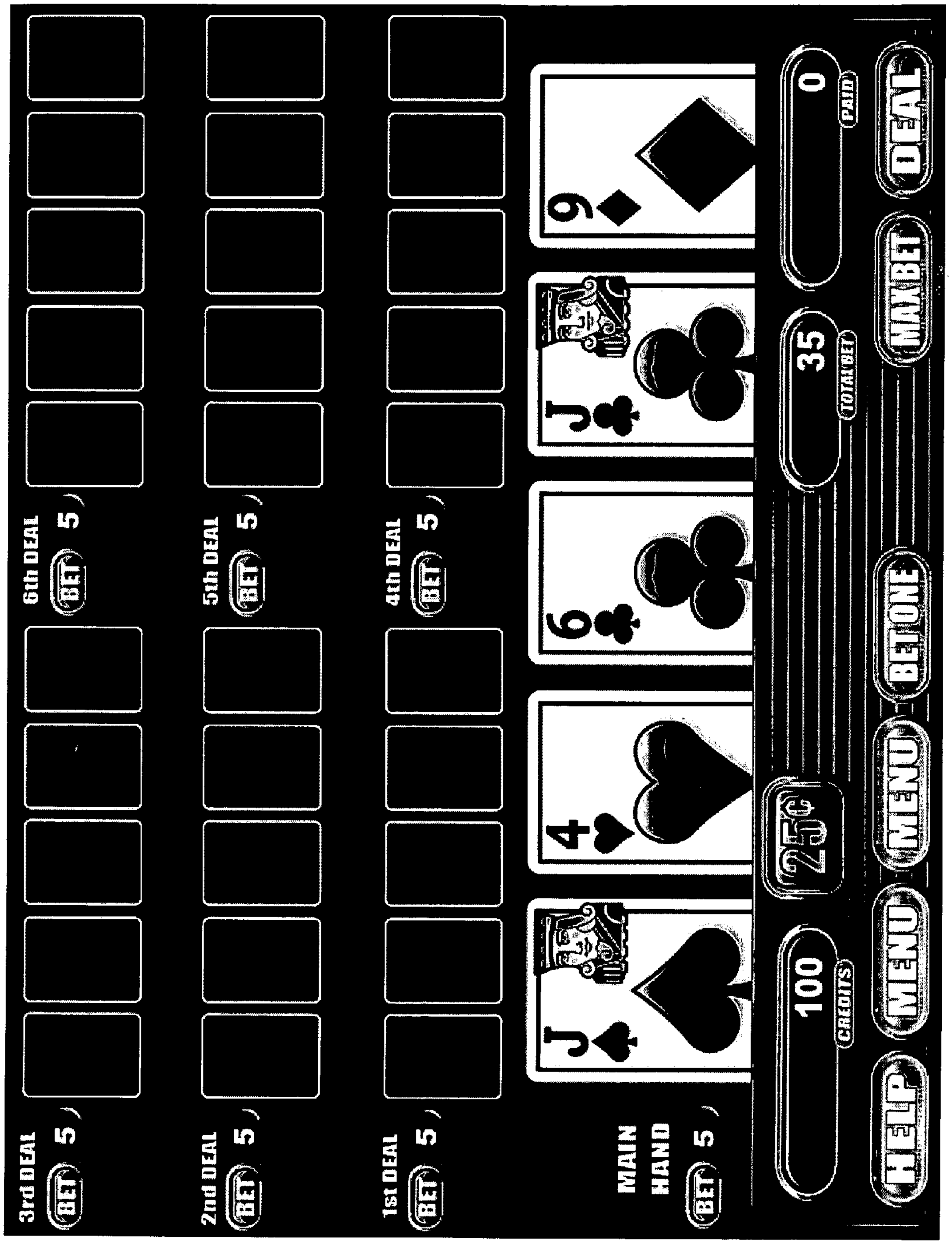

Next, the system generates a set of initial deal cards for the main hand (block 504). FIG. 6B illustrates a screen having exemplary set of initial deal cards.

Figure 6C:
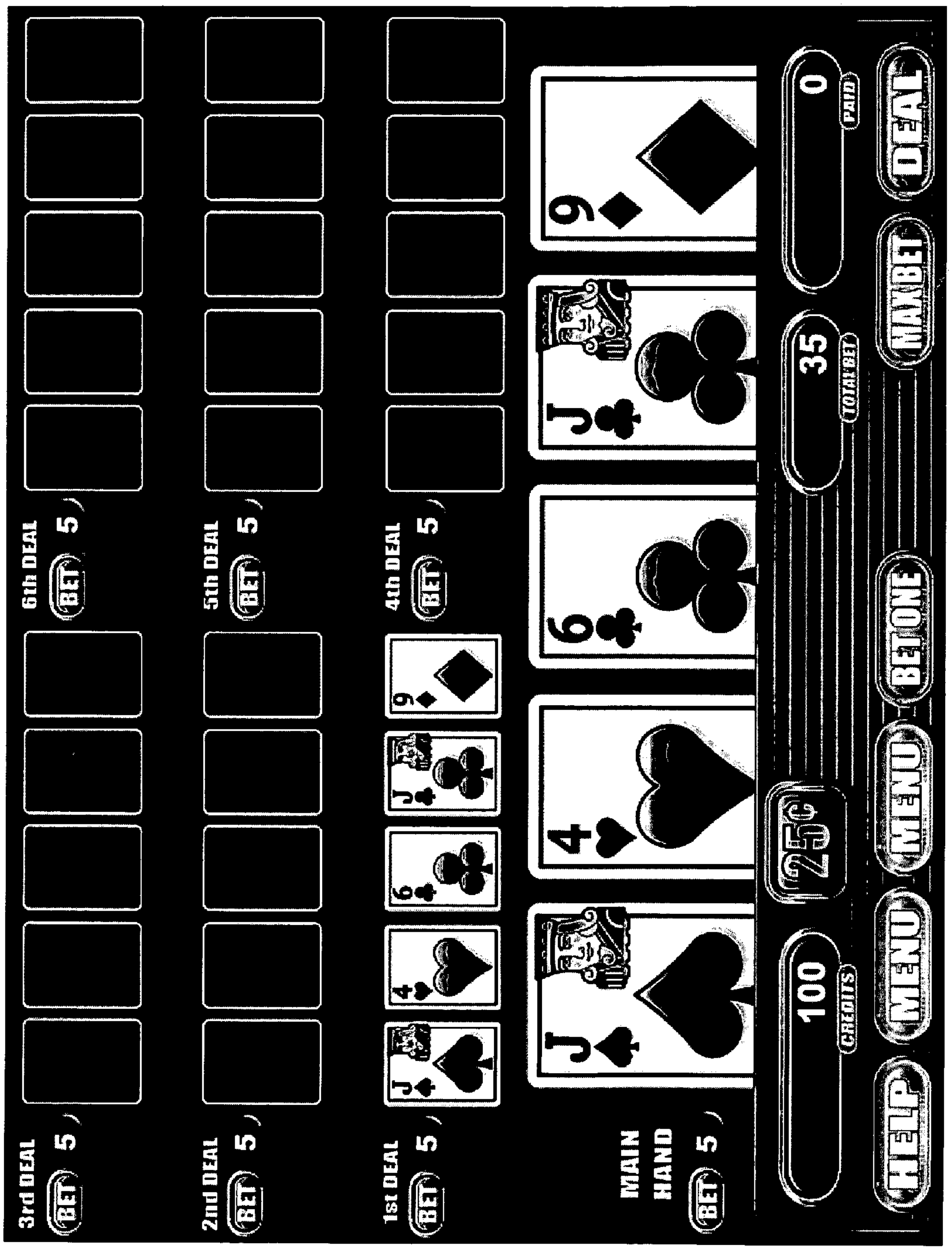

The set of initial deal cards are copied into the next available push-up hand position (block 506). FIG. 6C illustrates an exemplary screen after the set of initial deal cards have been copied to a push-up hand.

Figure 6D:
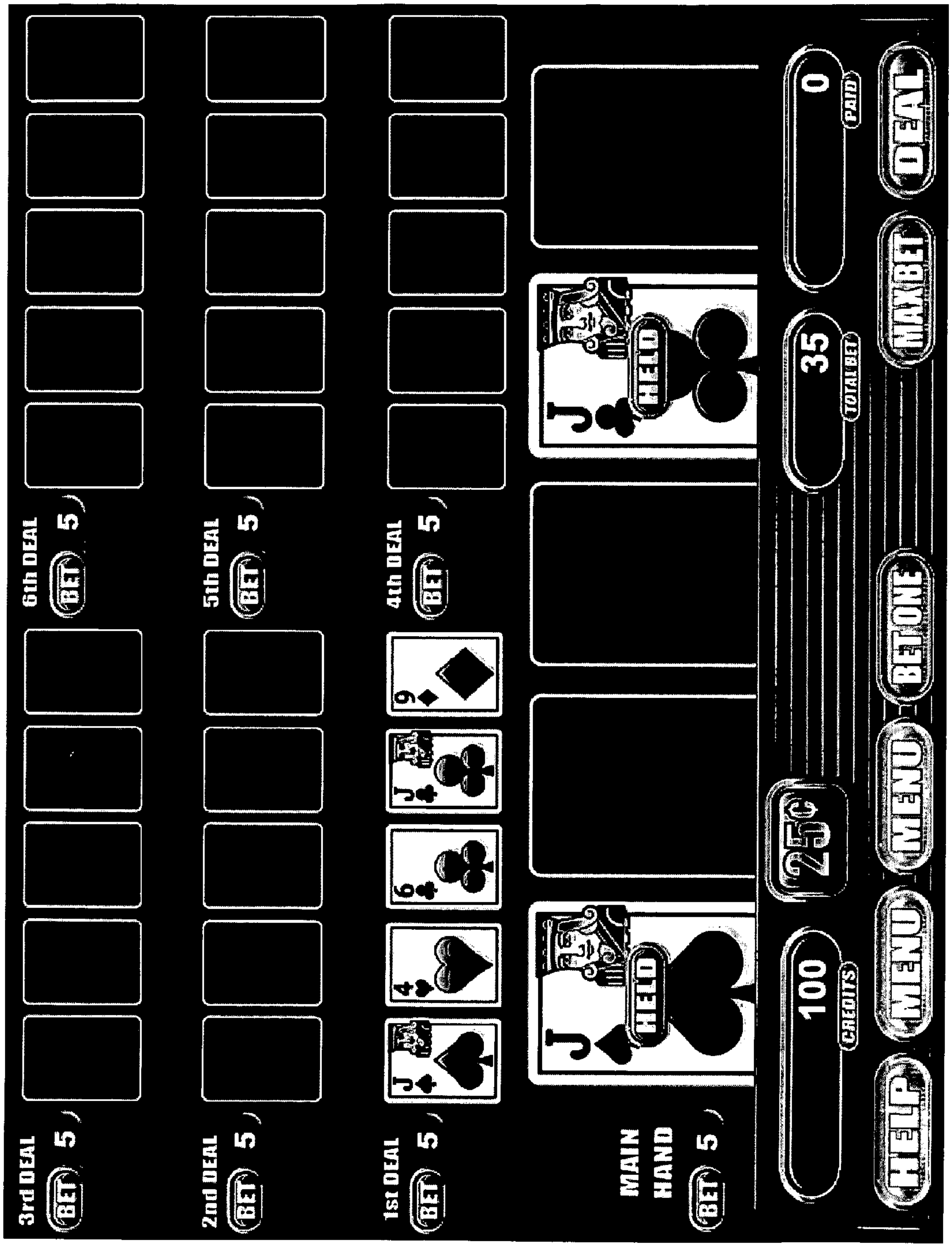

The method then continues with the play of the main hand (block 508). In some embodiments, the main hand may be played according to draw poker rules, while the push-up hands are played according to stud poker rules. However, the embodiments of the invention are not limited to any particular rules. In those embodiments where the main hand is played according to draw poker rules, play of the main hand continues with the system receiving a selection of zero or more cards that the player wishes to hold followed by generating replacement cards for those the player did not select to hold. FIG. 6D illustrates an exemplary screen where the player has chosen to hold two cards, both jacks.

Figure 6E:
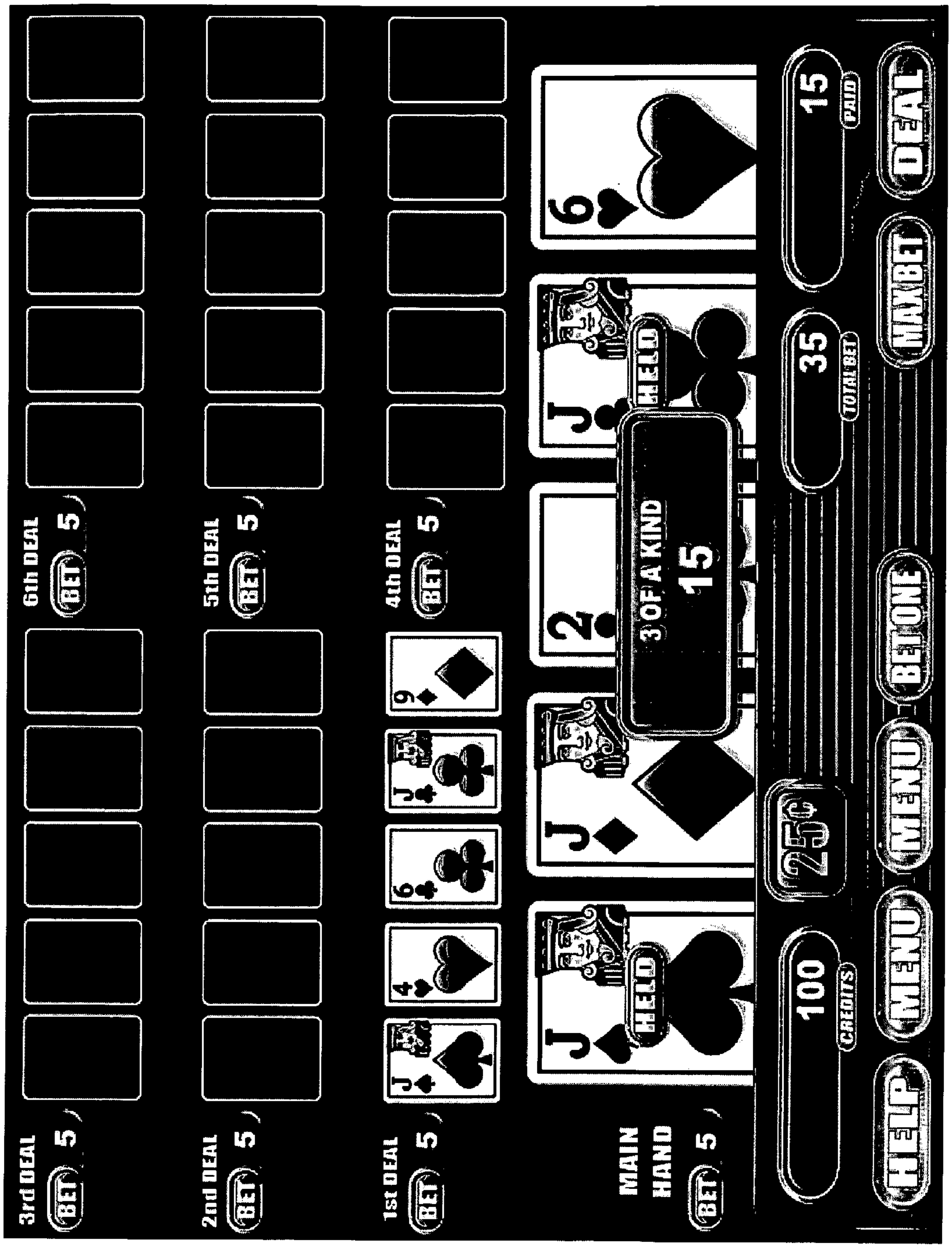

The system then determines a payout amount, if any, for the main hand (block 510). The payout amount is determined by comparing the set of cards in the main hand with a payout table for the poker type being played in the main hand. FIG. 6E illustrates an exemplary screen in which the end result of the hand is a "three of a kind". Note that the subsequent play (i.e. holding initial cards and drawing additional replacement cards) does not affect the state of the push-up hands.

Figure 6F:
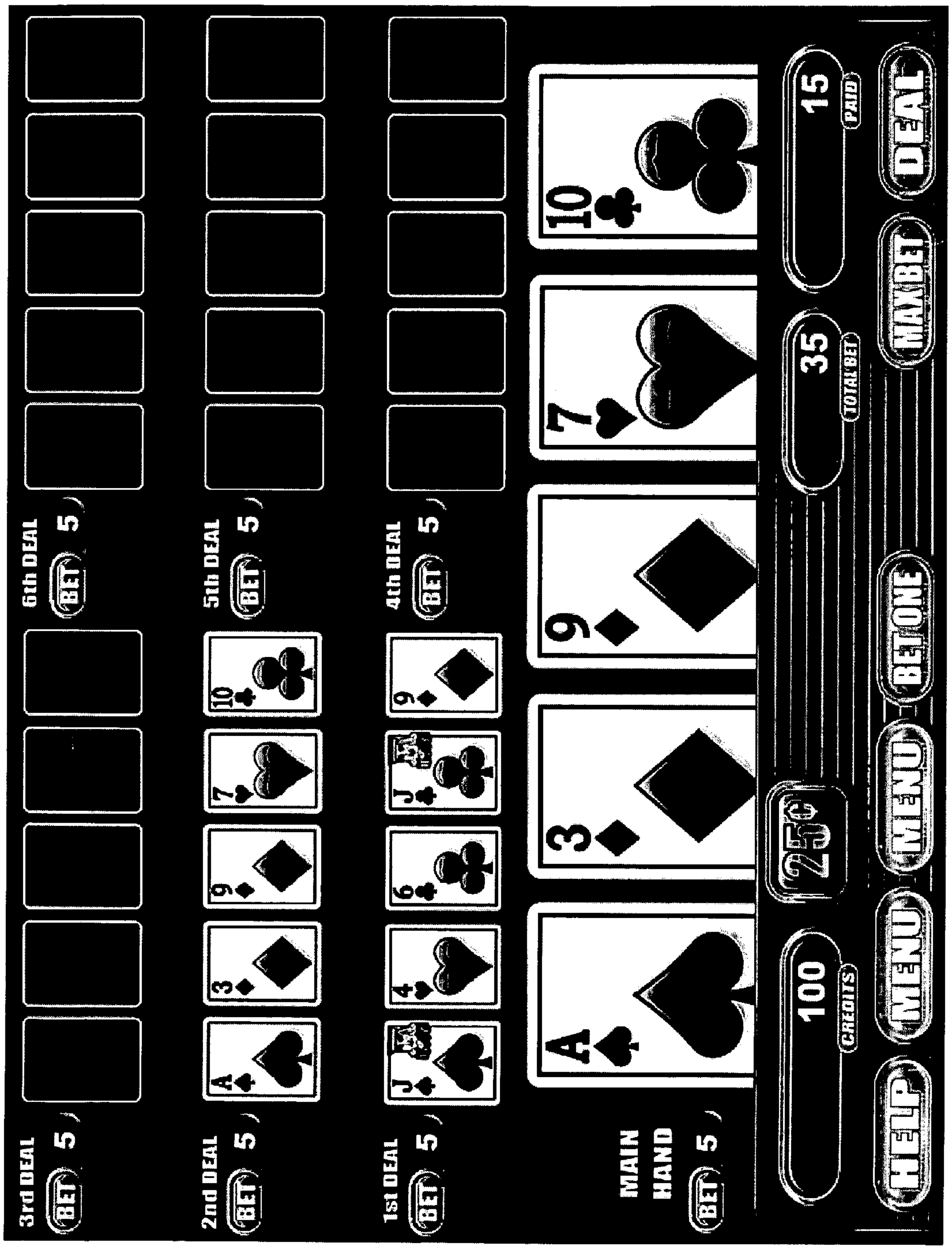
Figure 6G:
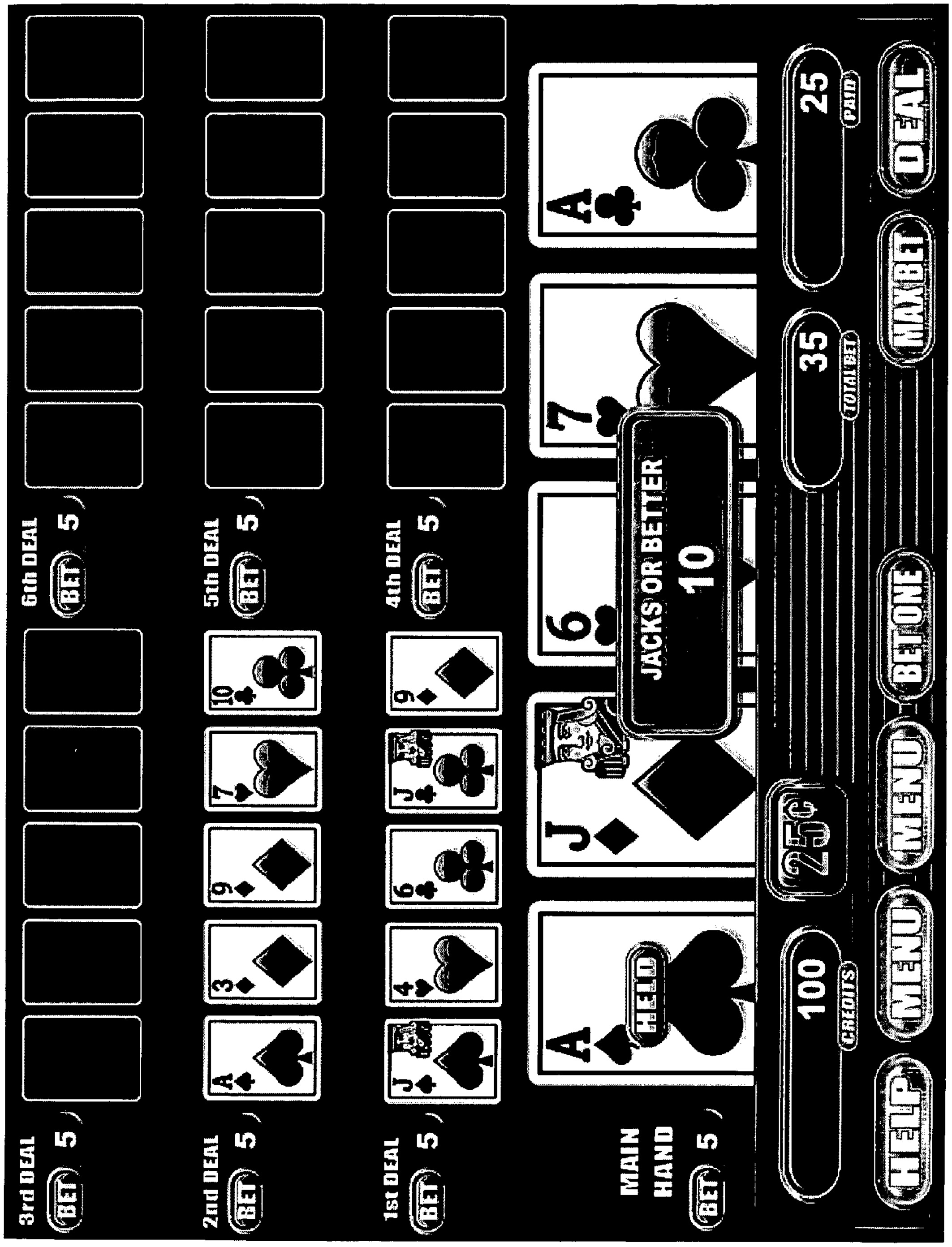

Next, the system checks to see if there are unused push-up hands remaining (block 512). If so, the system returns to block 504 to generate a new main hand. Play continues as described above, with FIG. 6F is an exemplary screen illustrating a set if initial deal cards for a second round in the main hand and a copy of the second set of initial deal cards copied to the next available push-up hand. FIG. 6G is an exemplary screen illustrating a hypothetical result of the second round of play in the main hand. The result of the second hand is a pair of aces with a payout of ten credits.

Figure 6H:
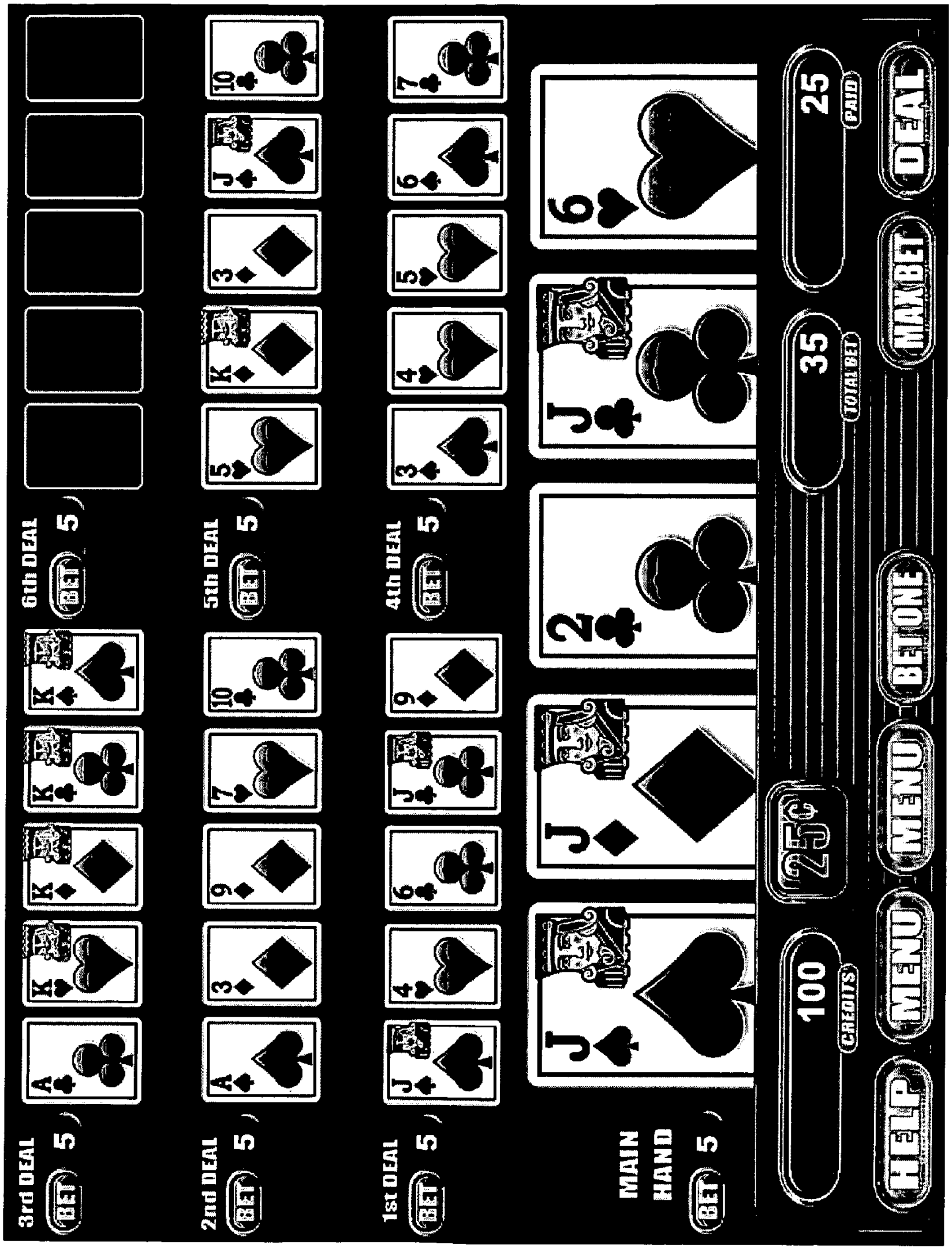
Figure 6I:
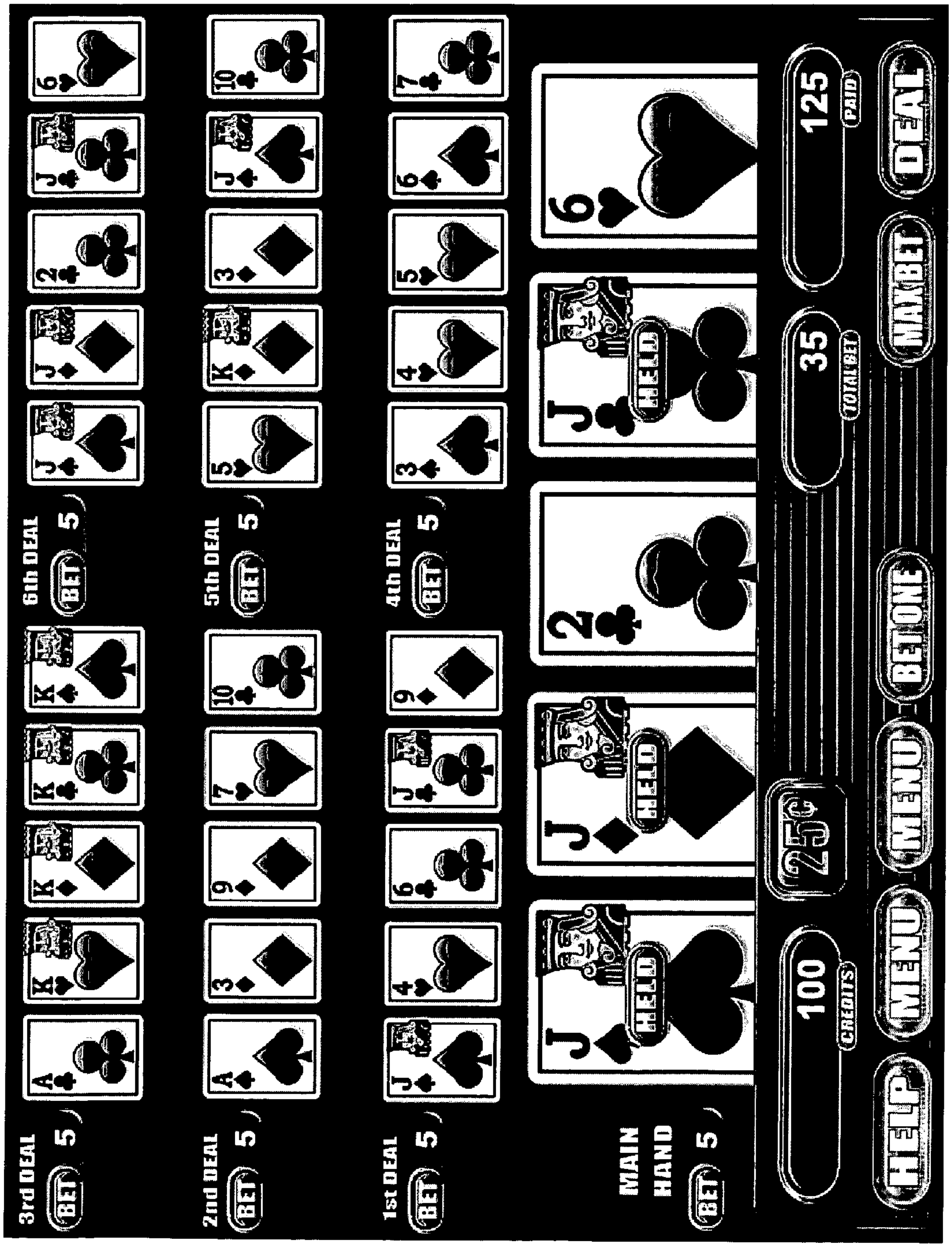

Each round of play in the main hand results in a copy of the set of initial deal cards being placed in the next unused push-up hand. FIG. 6H is an exemplary screen illustrating the last round of play, where only one push-up hand remains to be filled. FIG. 6I is an exemplary screen illustrating the copying of the initial set of deal cards for the last round of play in the main hand.

Figure 6J:
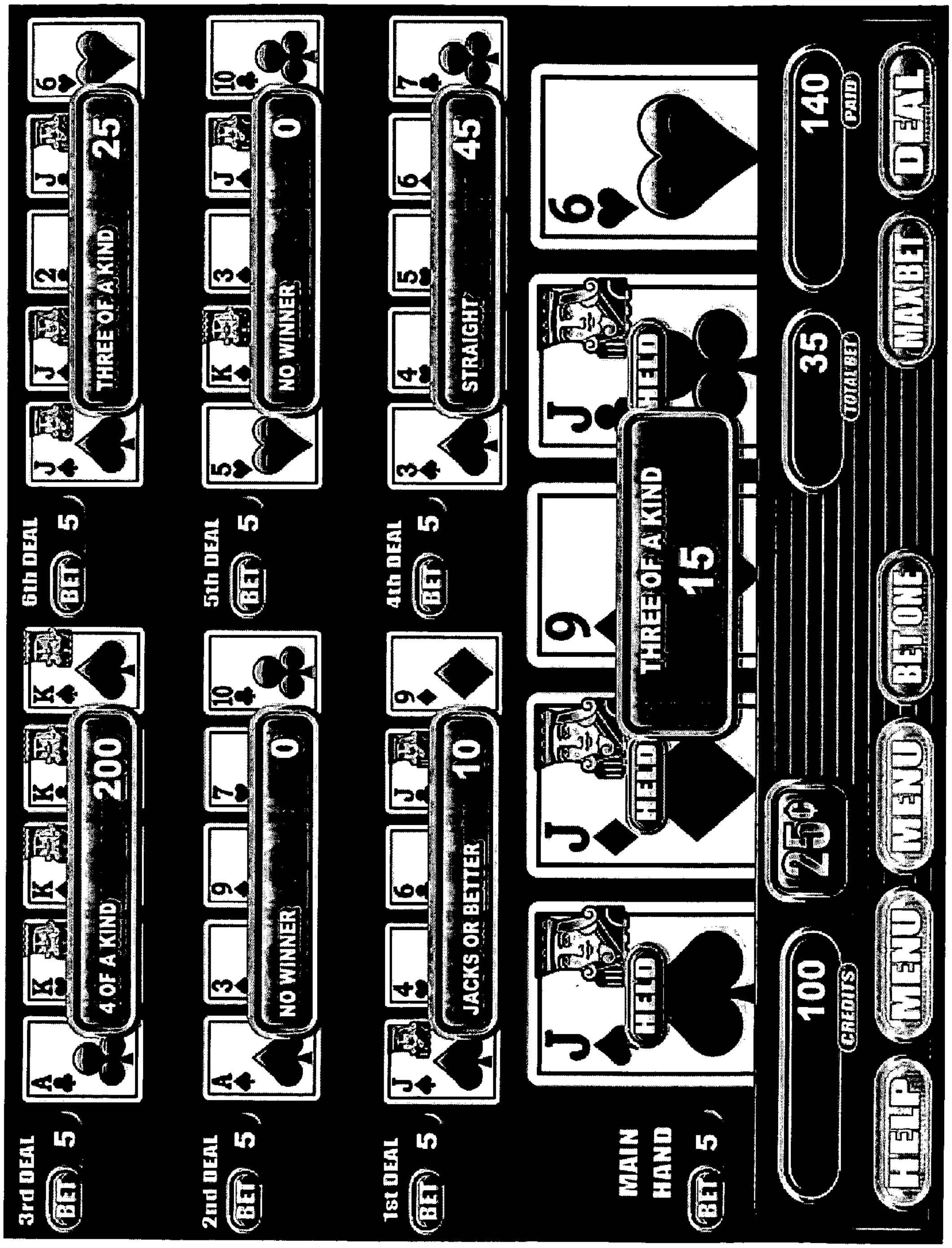

After all push-up hands have been filled and the last main hand played, the check at block 512 determines that no unused push-up hands remain. The system then proceeds to determine a payout for each of the push-up hands (block 514). In some embodiments, the payout for push-up hands are determined according to stud poker rules and a pay table appropriate for stud poker. FIG. 6J is an illustration of an exemplary screen showing the payout amounts for a hypothetical game play.

Figure 5B:
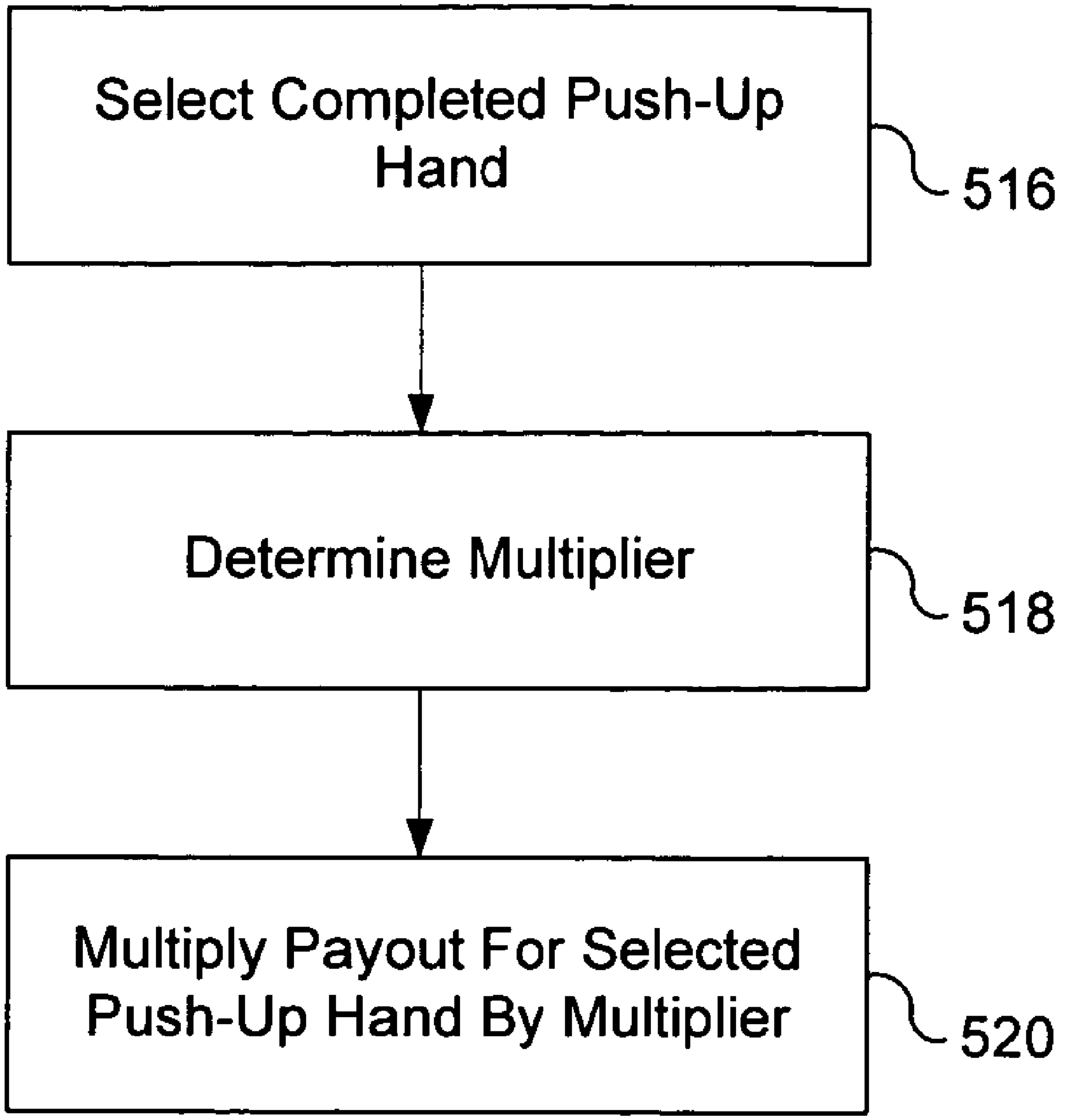

FIG. 5B is a flowchart illustrating a method for determining a payout for a completed push-up hand according to embodiments of the invention. In some embodiments of the invention, one of the completed push-up hands is selected (block 516). In some embodiments, the selection is a random selection, however other selection mechanisms are possible and within the scope of the invention.

Next, a multiplier amount is determined (block 518). In some embodiments, the multiplier amount is randomly generated within a predefined range of multipliers. In alternative embodiments, the multiplier amount is predetermined.

Figure 6K:
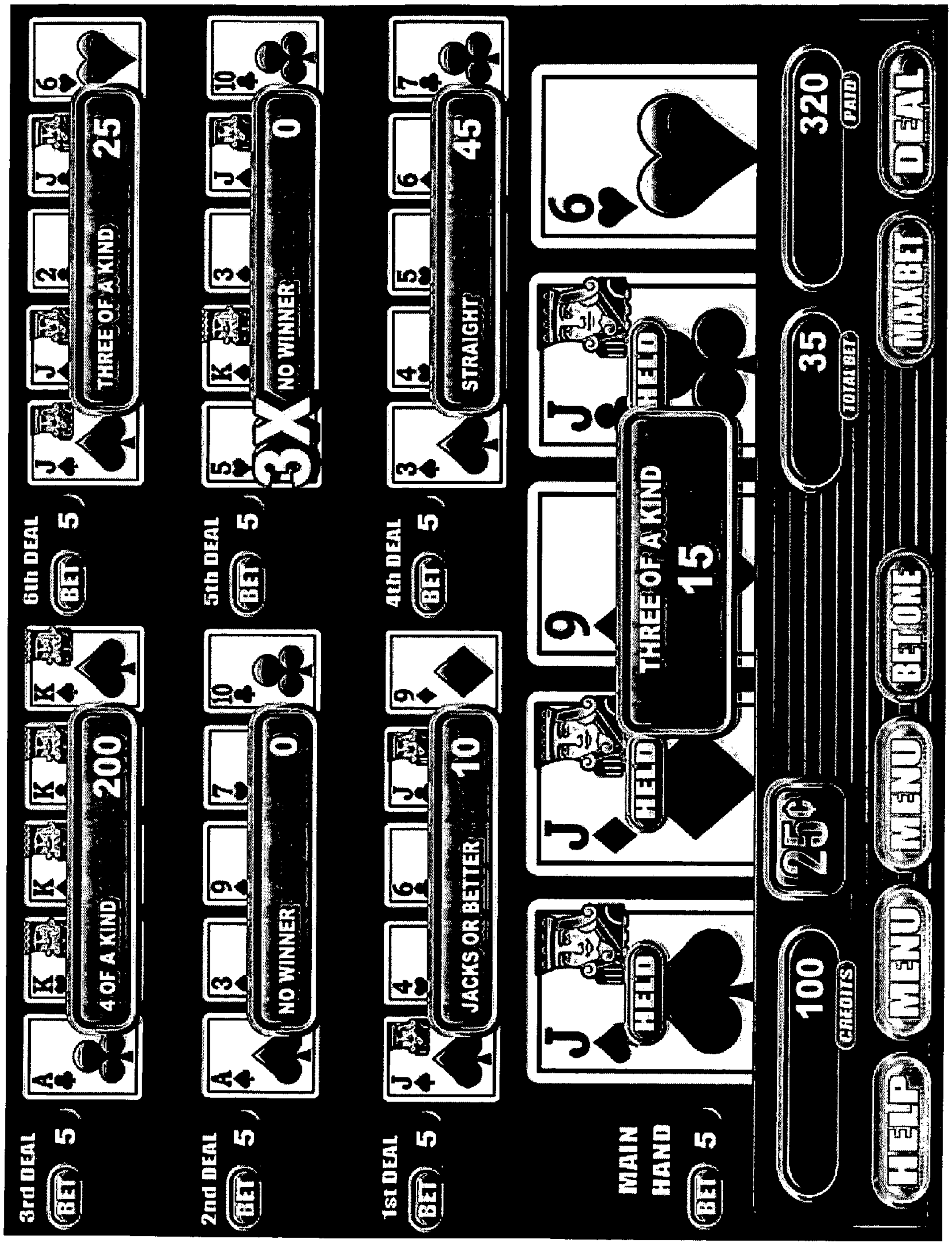

Finally, at block 520, the payout amount for the push-up hand selected at block 516 is multiplied by the multiplier amount determined at block 518. FIG. 6K is an illustration of an exemplary screen showing a hypothetical result where a fifth push-up hand has been randomly selected to receive a three times payout multiplier.

Figure 7:
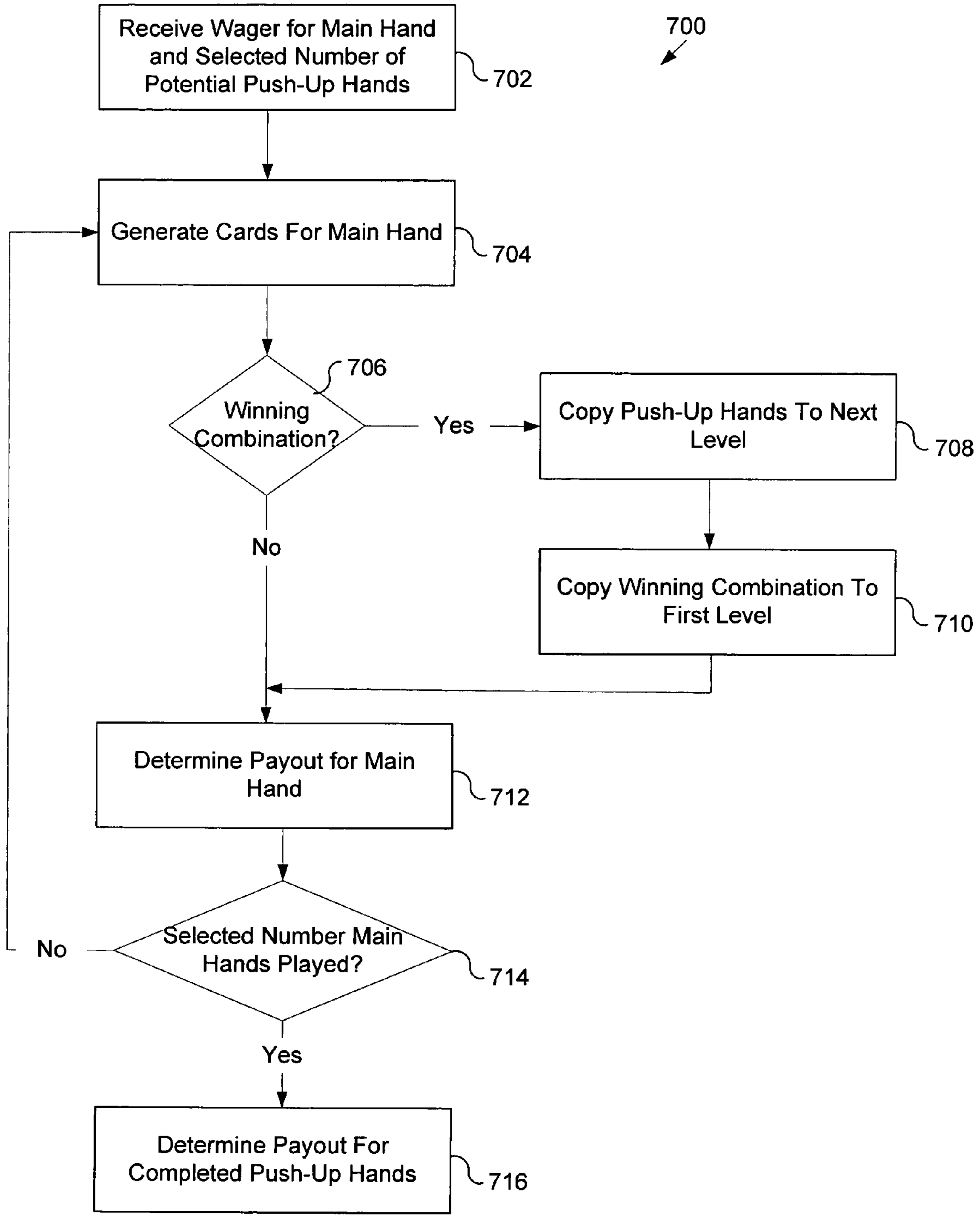
FIGS. 7 and 8 are flowcharts illustrating methods for providing a poker game with a push-up feature according to alternative embodiments of the invention.

FIG. 7 is a flowchart illustrating a method 700 for providing a poker game with a push-up feature according to alternative embodiments of the invention. The method begins by receiving a wager for main hand and a selected number of potential push-up hands in a manner similar to that described with reference to block 502 (block 702). A push-up hand is considered a potential push-up hand, because not all push-up hands will necessarily be used in method 700.

Next, the system generates cards for the main hand (block 704). The system then checks to see if there is a winning combination of cards in the main hand (according to the rules for the poker game being played and the payout table for the main hand). In some embodiments, the check for a winning combination may be performed on the set of initial deal cards. In alternative embodiments, the check for a winning combination may be performed after play on the main hand is complete for a round (e.g. after cards have been selected to be held and replacement cards dealt).

If a winning combination is present, then the method proceeds to copy the winning combination of cards into a push-up hand to create a completed push-up hand. In some embodiments, each completed push-up hand is copied to the push-up hand at the next level (block 708), and the winning combination is placed at the first level push-up hand (block 710). In alternative embodiments, the winning combination is copied into the first available unused push-up hand.

The system then determines a payout for the main hand (block 712).

If the selected number of main hands have not yet been played (block 714), then the method returns to block 704 to initiate play for another round. Otherwise, the method proceeds to determine payout amounts for each of the completed push-up hands block (716). As with method 500, a multiplier may be determined and applied to the push-up hands.

Figure 8:
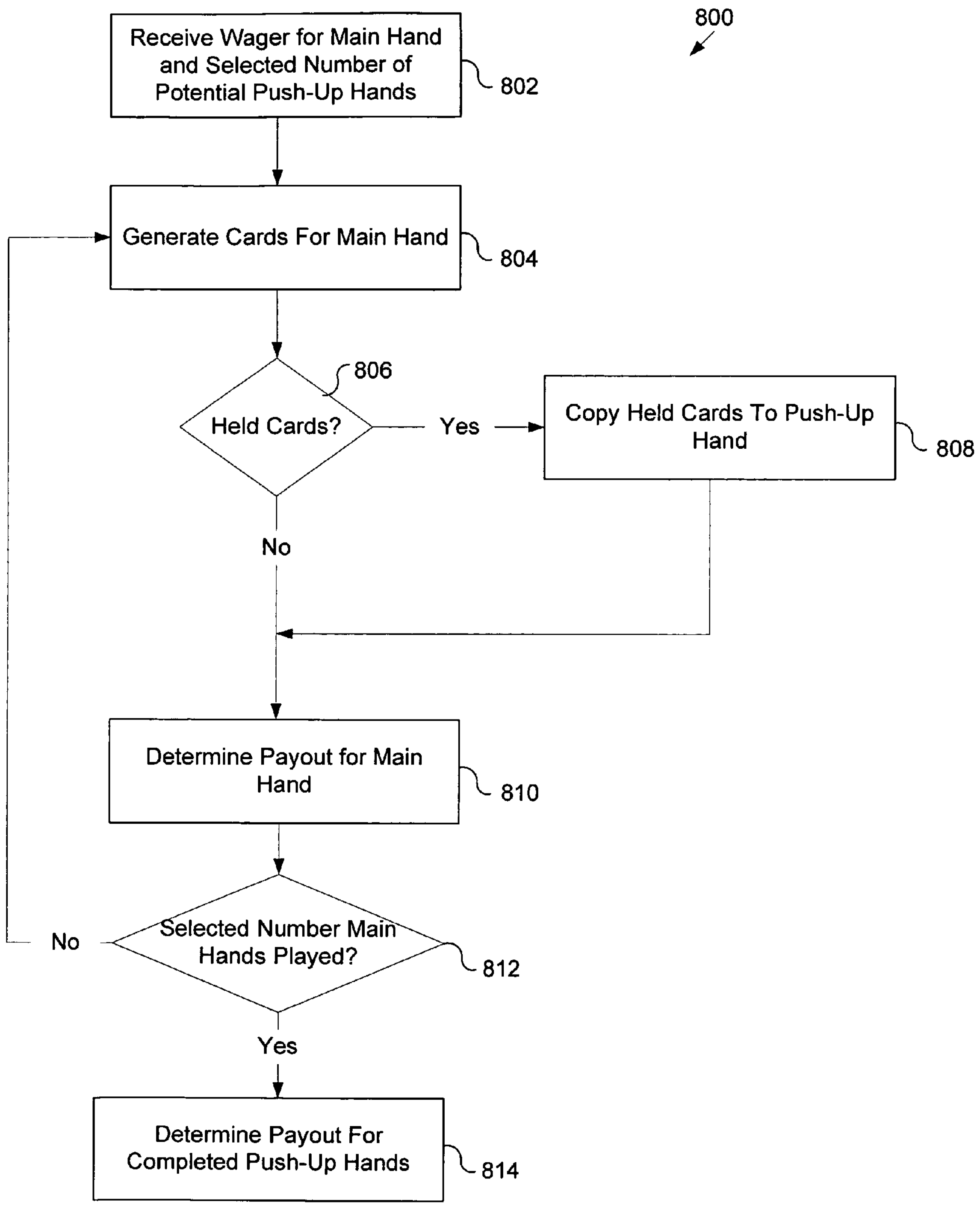

FIG. 8 is a flowchart illustrating a method 800 for providing a poker game with a push-up feature according to further alternative embodiments of the invention. Method 800 begins by receiving a wager for a main hand and a selected number of potential push-up hands (block 802).

A set of cards is then generated for the main hand (block 804). Play in the main hand continues, and the user may select cards to hold. If the player selects cards to be held (block 806), then the held cards are copied to an available push-up hand. Cards needed to complete the push-up hand may be randomly generated and added to the push-up hand to form a completed push-up hand (block 808).

When a round has been completed in the main hand, a payout for the main hand is then determined (block 810). A check is then made to determine if the selected number of main hands has been played (block 812). If not, the method returns to block 804 to begin a new round of play in the main hand. Otherwise, the method proceeds to determine payout amounts for each of the completed push-up hands block (814). As with method 500, a multiplier may be determined and applied to the push-up hands.

Systems and methods for providing a poker game with a push-up feature have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A method for operating a wagering game on a gaming machine, the method comprising:

receiving a wager for a plurality of main hands and a plurality of secondary hands;

for each of the plurality of secondary hands, performing the tasks of:

generating a set of initial deal cards for a selected main hand of the plurality of main hands, copying the entire set of initial deal cards for the selected main hand to a next unused secondary hand of the plurality of secondary hands to create a completed secondary hand for play according to rules of stud poker, wherein no changes can be performed to the completed secondary hand, performing changes to the selected main hand for play according to rules of draw poker, including receiving a selection of zero or more cards to hold in the selected main hand and generating replacements for cards not included in the selection, and determining a payout for the selected main hand according to the rules of draw poker; and determining a payout for each of the plurality of secondary hands according to the rules of stud poker.

2. The method of claim 1, further comprising:

selecting one of the plurality of completed secondary hands;

generating a multiplier value; and multiplying the payout for the selected secondary hand by the multiplier value.

3. The method of claim 2, wherein the multiplier value is generated within a range of multiplier values.

4. The method of claim 1, wherein the wager is evenly distributed across the main hand and the plurality of secondary hands.

5. The method of claim 1, wherein the wager comprises an individual wager applied to each of the main hand and the plurality of secondary hands.

6. The method of claim 1, wherein the plurality of secondary hands comprises at least 6 secondary hands.

7. The method of claim 1, wherein determining a payout includes determining a payout according to a first paytable for the rules of draw poker applied to the main hands, and a second paytable for the rules of stud poker applied to the secondary hands.

8. A method for operating a wagering game on a gaming machine, the method comprising:

receiving a wager for a plurality of main hands and a selected number of secondary hands, the selected number of secondary hands having a level specifying a sequence and including a first level secondary hand;

iteratively performing, for the selected number of secondary hands, the tasks of:

generating a set of cards for a main hand of the plurality of main hands, if the set of cards contains a winning combination of cards then:

copying each of the selected number of secondary hands to a next level secondary hand, and copying the winning combination of cards for the main hand to the first level secondary hand, and determining a payout for the main hand according to rules of draw poker; and determining a payout for each of plurality of secondary hands according to rules of stud poker.

9. The method of claim 8, wherein the set of cards containing a winning combination is determined from an initially generated set of cards for the main hand of each iteration.

10. The method of claim 8, wherein each level of secondary hand is assigned a multiplier value and further comprising multiplying the payout by the multiplier value for each level of secondary hand.

11. A method for operating a wagering game on a gaming machine, the method comprising:

receiving a wager for a plurality of main hands and a selected number of secondary hands, the selected number of secondary hands having a level specifying a sequence;

iteratively performing, for the selected number of secondary hands, the tasks of:

generating a set of cards for a main hand of the plurality of main hands, receiving a selection of held cards from the main hand, determining a payout for the main hand according to rules of draw poker, and copying the selection of held cards from the main hand to a next level secondary hand; and determining a payout for each of plurality of secondary hands according to rules of stud poker.

12. The method of claim 11, wherein each level of secondary hand is assigned a multiplier value and further comprising multiplying the payout by the multiplier value for each level of secondary hand.

13. A gaming machine comprising:

a processor;

a memory coupled to the processor;

a gaming application executable by the processor from the memory and operable to:

receive a wager for a plurality of main hands and a plurality of secondary hands;

for each of the plurality of secondary hands, perform the tasks of:

generate a set of initial deal cards for a selected main hand of the plurality of main hands, copy the entire set of initial deal cards for the selected main hand to a next unused secondary hand of the plurality of secondary hands to create a completed secondary hand for play according to rules of stud poker, wherein no changes can be performed to the completed secondary hand, change to the selected main hand for play according to rules of draw poker, including receiving a selection of zero or more cards to hold in the selected main hand and generating replacements for cards not included in the selection, and determine a payout for the selected main hand according to the rules of draw poker; and determine a payout for each of the plurality of completed secondary hands according to the rules of stud poker.

14. The gaming machine of claim 13, wherein the gaming application is further operable to:

select one of the plurality of completed secondary hands;

generate a multiplier value; and multiply the payout for the selected secondary hand by the multiplier value.

15. The gaming machine of claim 14, wherein the multiplier value is generated within a range of multiplier values.

16. The gaming machine of claim 13, wherein the wager is evenly distributed across the main hand and the plurality of secondary hands.

17. The gaming machine of claim 13, wherein the wager comprises an individual wager applied to each of the main hand and the plurality of secondary hands.

18. The gaming machine of claim 13, wherein the plurality of secondary hands comprises at least 6 secondary hands.

19. The gaming machine of claim 13, wherein determining a payout includes determining a payout according to a first paytable for the rules of draw poker applied to the main hands, and a second paytable for the rules of stud poker applied to the secondary hands.

20. A computer-readable medium having computer executable instructions stored thereon for performing a method for operating a wagering game on a gaming machine, the method comprising:

receiving a wager for a main hand and a plurality of secondary hands;

for each of the plurality of secondary hands, performing the tasks of:

generating a set of initial deal cards for the main hand, copying the entire set of initial deal cards for the main hand to a next unused secondary hand of the plurality of secondary hands to create a completed secondary hand for play according to rules of stud poker, wherein no changes can be performed to the completed secondary hand, performing changes to the selected main hand for play according to rules of draw poker, including receiving a selection of zero or more cards to hold in the selected main hand and generating replacements for cards not included in the selection, and determining a payout for the main hand according to rules of draw poker; and determining a payout for each of the plurality of completed secondary hands according to rules of stud poker.

21. The computer-readable medium of claim 20, wherein the method further comprises:

selecting one of the plurality of completed secondary hands;

generating a multiplier value; and multiplying the payout for the selected secondary hand by the multiplier value.

22. The computer-readable medium of claim 20, wherein the multiplier value is generated within a range of multiplier values.

23. The computer-readable medium of claim 20, wherein the wager is evenly distributed across the main hand and the plurality of secondary hands.

24. The computer-readable medium of claim 20, wherein the wager comprises an individual wager applied to each of the main hand and the plurality of secondary hands.

* * * * *